(12) United States Patent
Huang et al.

(10) Patent No.: US 10,798,707 B2
(45) Date of Patent: Oct. 6, 2020

(54) ENHANCED DATA PATH STRUCTURE FOR MULTI-BAND OPERATIONS IN WIRELESS COMMUNICATIONS

(71) Applicant: Intel Corporation, Santa Clara, CA (US)

(72) Inventors: Po-Kai Huang, San Jose, CA (US); Emily H. Qi, Gig Harbor, WA (US); Carlos Cordeiro, Portland, OR (US); Elad Oren, Tel Aviv (IL); Elad Levy, Rishon Le Zion (IL); Michal Glik, Kfar Saba (IL)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/230,492

(22) Filed: Dec. 21, 2018

(65) Prior Publication Data

US 2019/0124660 A1    Apr. 25, 2019

Related U.S. Application Data

(60) Provisional application No. 62/657,150, filed on Apr. 13, 2018.

(51) Int. Cl.
*H04W 72/04* (2009.01)
*H04W 76/14* (2018.01)

(52) U.S. Cl.
CPC ....... *H04W 72/0453* (2013.01); *H04W 76/14* (2018.02)

(58) Field of Classification Search
CPC .......................... H04W 76/14; H04W 72/0453
See application file for complete search history.

(56) References Cited

U.S. PATENT DOCUMENTS

| | | | |
|---|---|---|---|
| 2017/0347255 A1* | 11/2017 | Liu | H04W 76/10 |
| 2018/0014341 A1* | 1/2018 | Jung | H04W 76/14 |
| 2018/0041941 A1* | 2/2018 | Park | H04W 40/34 |
| 2018/0139755 A1* | 5/2018 | Patil | H04W 68/005 |
| 2018/0176931 A1* | 6/2018 | Patil | H04L 12/18 |
| 2018/0242135 A1* | 8/2018 | Lee | H04W 8/00 |
| 2018/0249432 A1* | 8/2018 | Kurian | H04W 56/002 |
| 2019/0007821 A1* | 1/2019 | Kim | H04W 8/005 |
| 2020/0015152 A1* | 1/2020 | Yu | H04W 84/18 |

* cited by examiner

*Primary Examiner* — Brian D Nguyen
(74) *Attorney, Agent, or Firm* — Eversheds Sutherland (US) LLP

(57) ABSTRACT

This disclosure describes systems, methods, and devices related to data path structure for multi-band operation. A neighbor awareness networking (NAN) device may determine a first NAN data link (NDL) associated with a first frequency band, a first processing core, and a first NAN management interface (NMI). The NAN device may determine a second NDL associated with a second frequency band, a second processing core, and a second NMI. The NAN device may send one or more multi-band indications of at least one of the first NMI or the second NMI, the one or more multi-band indications being indicative of at least one of the first frequency band or the second frequency band. The NAN device may establish a NAN data path (NDP) with a second NAN device using at least one of the first NDL or the second NDL.

20 Claims, 11 Drawing Sheets

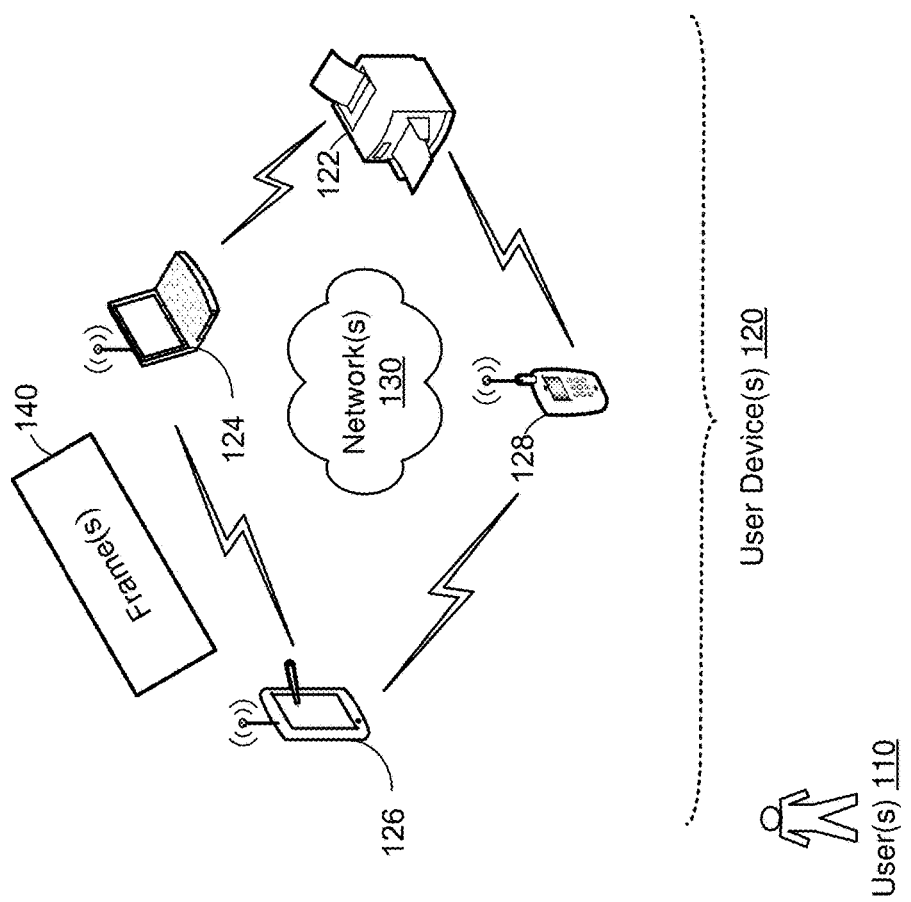

ENHANCED DATA PATH STRUCTURE FOR MULTI-BAND OPERATIONS IN WIRELESS COMMUNICATIONS

CROSS-REFERENCE TO RELATED APPLICATIONS

This application claims the benefit of U.S. Provisional Application No. 62/657,150, filed Apr. 13, 2018, the disclosure of which is incorporated by reference as if set forth in full.

TECHNICAL FIELD

This disclosure generally relates to systems, methods, and devices for wireless communications and, more particularly, to data path structure for multi-band operation.

BACKGROUND

Wireless devices are becoming widely prevalent. Recently, there has been a shift in technology to support direct wireless communications between wireless devices. Neighbor awareness networking (NAN) may refer to a specification for Wi-Fi for device and/or service discovery and peer-to-peer communication. NAN may describe the formation of a cluster of devices (referred to as a NAN cluster) for devices in physical proximity to one another.

BRIEF DESCRIPTION OF THE DRAWINGS

FIG. 1 depicts a diagram illustrating an example network, in accordance with one or more example embodiments of the present disclosure.

DETAILED DESCRIPTION

Figure 2A:
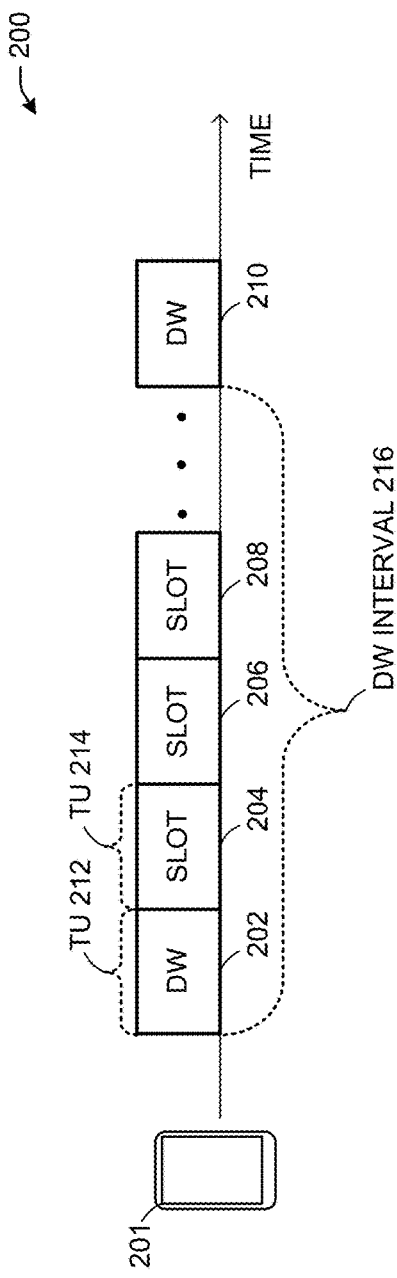
FIG. 2A depicts an illustrative neighbor awareness networking (NAN) synchronization structure.

Example embodiments described herein provide certain systems, methods, and devices for providing data path structure for multi-band operation.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Neighbor Awareness Networking (NAN) is a peer-to-peer discovery and communication protocol defined by the IEEE 802.11 communication standards. The NAN protocol establishes synchronized timing and slots for station devices (STAs) so that STAs may discover each other and exchange data communications using specific slots. For example, the STAs may discover each other during a discovery window (DW), then two STAs may establish a data path (e.g., a NAN data path—NDP) and agree on specific slots referred to as NAN data links (NDLs) to facilitate data communication between the STAs.

An established NDL may be used for executing/exchanging multiple services between the two NAN devices. Different services may have different requirements like security and addresses, for example. As a result, specific NAN data paths (NDPs) may be built for different services. The address that may be used for a NDP may be called a NAN data interface (NDI). An address that may be used for discovery before establishing a NDP may be called a NAN management interface (NMI).

Some NDIs and NMIs and some NDPs and NDLs may be agnostic to a frequency band used between two NAN devices (e.g., some NDIs and NMIs and some NDPs and NDLs may be used for different frequency bands). The ability to use different frequency bands may be possible because the most common frequency bands between two NAN devices may include the 2.4 GHz band and the 5 GHz band, and the medium access control (MAC) operation for these two bands may be provided by one processing core (e.g., a single hardware chip). Operations for other frequency bands, such as higher frequency bands at 60 GHz, may be supported by separate processing cores (e.g., the 60 GHz band may require a different chip than a chip designed to support the 2.4 GHz and 5 GHz bands) due to different frequency modulations needed for the different frequency bands, and because the processing core supporting the lower 2.4 GHz and 5 GHz frequency bands may support an omni-directional antenna, while the processing core supporting an antenna at a higher frequency band such as 60 GHz may support a directional antenna which may be beamforming-trained and may use a different MAC. For example, just because a processing core may support a 2.4 GHz and 5 GHz frequency in Wi-Fi or other wireless communications does not mean that the same processing core may support another higher frequency Wi-Fi communication. MAC and other modifications to a processing core may be needed to support a higher frequency band, and the operations supporting the different frequency bands may require coordination.

A NAN MAC may facilitate synchronization in a NAN cluster (e.g., multiple NAN devices synchronized to a common time source) in which a NAN Device is operating by participating in a NAN synchronization beacon frame transmission. As part of the synchronization function, the NAN MAC may run a time synchronization factor (TSF) timer. The NAN MAC is also responsible for transmitting NAN discovery beacon frames and conducting passive NAN discovery to find out available NAN clusters.

A NAN discovery engine which may be used by services of a NAN device may be accessed through a NMI. A NAN device may keep a NMI and may maintain one or more NDI addresses. The NMI and NDI may be globally unique or locally administrated. A NDI may be the same as a NMI. A NAN device may use the NMI or NDI as a transmitter address for any management frames sent within a NAN cluster. A NAN device may use the NMI or NDI of an intended recipient NAN device as a receiver address for any unicast management frames sent within a NAN cluster, and may use the broadcast address as a receiver address for management frames destined for any NAN devices within a NAN cluster. When a NAN device sets up a NDP with a peer NAN device, it may select an NDI for the NDP. The NAN device may use the NDI as a transmitter address for any data frames associated with that NDP. A NAN Device may use the same NDI for multiple different NDPs, or it may use different NDIs for different NDPs. A NDL may be uniquely identified by the NMIs of the two NAN devices that established the NDL.

Services used by NAN devices may operate better using certain frequency bands, and therefore the processing cores associated with those frequency bands. For example, higher frequency bands may be less reliable for transmissions of longer distances than lower frequency bands. A NAN device using a service such as a voice service may experience better stability using a 2.4 GHz or 5 GHz frequency band than using a 60 GHz or other high-frequency band, or transmissions of longer distances may be more reliable in a 2.4 GHz or 5 GHz frequency band than using a 60 GHz or other high-frequency band. A NAN device may transfer a NDP for a service from a NDL in one frequency band to another frequency band based on the needs of the service, such as transmission distance. Such a transfer may require switching operations from one processing core to another processing core. For example, switching a NDP from a 2.4 GHz or 5 GHz frequency band to a 60 GHz or other high-frequency band may require switching operations from one processing core to another processing core with different characteristics, such as different MAC characteristics and different antenna settings. Thus, to switch operations between processing cores may require enhanced coordination.

As Wi-Fi devices moves to multi-band capability, for example with the addition of a 60 GHz frequency band, Wi-Fi devices may need an additional processing core to facilitate 60 GHz operations due to different baseband (BB) and lower MAC operations. As a result, a corresponding design consideration for NAN data interfaces and a NAN data structure may require corresponding changes.

Example embodiments of the present disclosure relate to systems, methods, and devices for a data path structure for multi-band operation.

In one embodiment, a data path structure for multi-band operation system may define the following data architecture for accommodating the 60 GHz band operation.

In one embodiment, in option (1): a separate NDL may be built for 60 GHz band. One of the NAN devices may use a different NMI to set up the NDL in the 60 GHz band. A NAN device may indicate to another NAN device the NMI used by the same NAN device in different band. The NMI in a different band may be communicated to the other NAN device by using the multi-band element defined in the IEEE 802.11 specification, for example. The NMI in a different band may be indicated by defining new multi-band attribute. For example, NAN measurement frame sent during a discovery window and/or a NAN frame sent during an NDL negotiation may indicate the NMI. A NDP may be set up to use the NDL in a 2.4 GHz/5 GHz band, the 60 GHz band, or both bands (e.g., based on a distance between the NAN devices). The same NDI may be used for the NDL in the 2.4 GHz/5 GHz band or the 60 GHz band. A NDP may be transferred from the NDL in the 60 GHz band to the 2.4 GHz/5 GHz band, or vice versa (e.g., based on a distance between the NAN devices).

In one embodiment, in option (2): one NDL (e.g., pipe) may be built for the 2.4 GHz/5 GHz/60 GHz band (e.g., one NDL for both the 2.4 GHz/5 GHz band and the 60 GHz band). This may represent a direct extension of an existing data structure. Only one NMI may be used for the NDL setup. A NDP may indicate a requirement of transmitting in certain bands. Option (2) may be a subcase of option (1) depending on the usage of NMI on different bands between two devices.

In one embodiment, an advantage of option (1) may be because a different MAC core may be used for NAN operations in the 2.4 GHz/5 GHz band than for the 60 GHz band, the nature of NAN communications may be different in the 60 GHz (or other higher frequency) band. For example, the range/distance between devices may impact which NAN services are available. A schedule setup operation may use a separate data link from the NDL setup. Of two NAN devices in communication, one NAN device may use the same NMI for different cores, while the other NAN device may use a different NMI for respective cores.

In one embodiment, option (2) may be useful when a device may unify a NAN operation of two different MAC cores (e.g., a 2.4 GHz/5 GHz MAC core and a 60 GHz MAC core) into a single chip. Because a data link in the 60 GHz band may be unstable due to beamforming training and line of sight requirements, a NAN service such as a voice service (e.g., a service requiring a stable operation) may be better in the 2.4 GHz/5 GHz band. Thus, a NAN device may request a transfer from the 60 GHz band to the 2.4 GHz/5 GHz band based on the type of service used by the NAN devices.

In one embodiment, using option (1), a NAN device may maintain the operation of multiple NMIs in different bands. For example, one NMI may be used for the 2.4/5 GHz band, and another NMI may be used for the 60 GHz or other higher frequency band. A NDL may be established for any NMI in any band. A NDL between two NAN devices may be determined by a pair of NMIs used by the two NAN devices for NDL setup. The NAN devices may send frames including a multi-band element, which may communicate the NMI for any band (including NMIs for multiple bands). An STA MAC address field of the multi-band element may indicate the NMI used for a band indicated by the multi-band element (e.g., an NMI may be associated with the band indicated by a band identifier included in the multi-band element). A basic service set identifier (BSSID) of the multi-band element may be set to indicate a NAN cluster identifier associated with a NAN cluster. If a discovery beacon is transmitted in a band indicated by the multi-band element, a beacon interval field of the multi-band element may be set to a discovery beacon interval (e.g., the time interval between the transmission of discovery beacons) in a band indicated by the multi-band element, and a TSF offset field of the multi-band element may be set to indicate a TSF offset of a discovery beacon in the indicated band to a discovery beacon in a current band. If a discovery beacon is not transmitted in a band indicated by the multi-band element, the beacon interval field and the TSF offset fields may be reserved. The multi-band element may be included in an element container attribute of a NAN frame.

In one embodiment, the multi-band information may be included in a multi-band attribute, which may be added to an existing format of the multi-band element. The multi-band information may include an NMI in the band indicated by the multi-band element. The multi-band information may include an operating class (e.g., indicating a channel set for which the multi-band attribute is applicable), a band identifier, and a channel number. Multi-band information may be included during the NDL/NDP setup (e.g., using a NAN data path request/response frame). For example, the multi-band information may be included in a multi-band element in an element container attribute of a frame, or in a multi-band attribute included in a NDL/NDP set up of the 2.4/5 GHz band to indicate the NMI used in the 60 GHz band.

In one embodiment, the multi-band information may be included in a NAN service discovery frame (SDF), NAN action frame (NAF), a NAN synchronization beacon, a NAN discovery beacon, or other NAN frames (e.g., as defined by the NAN technical standard). The multi-band information may be included in a NDL/NDP set up to indicate allowed bands for NDL set up. For example, if a NDL is established between two NAN devices using NMI 1 and NMI 2 on a first band, and if the NAN devices also use NMI1 and NMI 2 on a second band, then the NAN devices may apply the NDL to the second band.

In one embodiment, a NDP may be associated with a single NDL or with multiple NDLs. When a NDP is associated with a single NDL, packets of a NDP may be transmitted using the associated NDL. When a NDP is associated with multiple NDLs, packets of the NDP may be transmitted in any of the associated NDLs using link aggregation, for example. The NMIs used by the setup of the NDP may determine which NDL(s) is/are associated with the NDP. A separate NDP set up may be used if a NDP intends to associate with multiple NDLs.

In one embodiment, a NAN device may terminate a NDP on an indicated NDL (e.g., a NDL indicated by a transmitter address or receiver address of a frame). The indicated NDL may refer to an NMI of the NDL. The NDL may be indicated using a NAF.

In one embodiment, a NAN device may select an NDI during a NDP setup. For example, the same NDI may be used with different NDLs. If an NDP is associated with only one NDL, a NAN device may indicate the transfer of an NDP to another NDL (e.g., a transfer from a NDL in one band to a NDL in another band). A NAN device may include the multi-band information and may indicate corresponding NMIs on both connected NAN devices to identify a destined NDL used to transfer the NDP.

In one embodiment, a lower MAC layer may provide feedback to an upper MAC layer regarding an available band operation from a peer NAN device. A discovery result function may be used by a NAN device to provide feedback regarding the multi-band information from the peer NAN device. The upper MAC layer may request a band requirement for a NDP setup. A NDP may operate on certain bands and not on other bands, or may have no band operating restrictions. A NAN layer may restrict the transmission of data of a NDP on certain bands based on requirements of a NDP. The NAN layer may set up a NDL based on an indicated NDP requirement. For example, the NAN layer may set up a NDL on certain bands allowed by the NDP requirement. The upper MAC layer may indicate a corresponding NMI of a peer NAN device for a setup which may include the setup of a NDL on a specific band. Request signaling may be included in a data request process.

In one embodiment, using option (2), if only one NMI is used at both NAN peer devices for all bands, then only NDL may need to be established. As a result, one NMI may be used for different bands, eliminating a need to include multi-band information. The upper MAC layer may request a band requirement for a NDP setup. The NDP may operate in some or all bands.

The above descriptions are for purposes of illustration and are not meant to be limiting. Numerous other examples, configurations, processes, etc., may exist, some of which are described in detail below. Example embodiments will now be described with reference to the accompanying figures.

FIG. 1 depicts a diagram illustrating an example network, according to some example embodiments of the present disclosure. Wireless network 100 can include one or more user devices 120 (e.g., 122, 124, 126, or 128), which may communicate in accordance with wireless standards, such as the IEEE 802.11 communication standards. For example, two or more wireless devices may perform connectivity procedures with one another in order to set up Wi-Fi data sessions, according to some example embodiments of the present disclosure. In the example of FIG. 1, a wireless communication channel may be established between two or more wireless devices (e.g., user device(s) 120), where a first user device 120 may correspond to a service seeker, and a second user device 120 may correspond to a service advertiser. A service advertiser may be a wireless device that may advertise and provide one or more of these services over a wireless communication channel. The user device(s) 120 may be wireless devices that are non-stationary and do not have fixed locations. A service seeker may be a wireless device that is seeking certain services, such as printing, playing content, sending, docking, etc.

Figure 8:
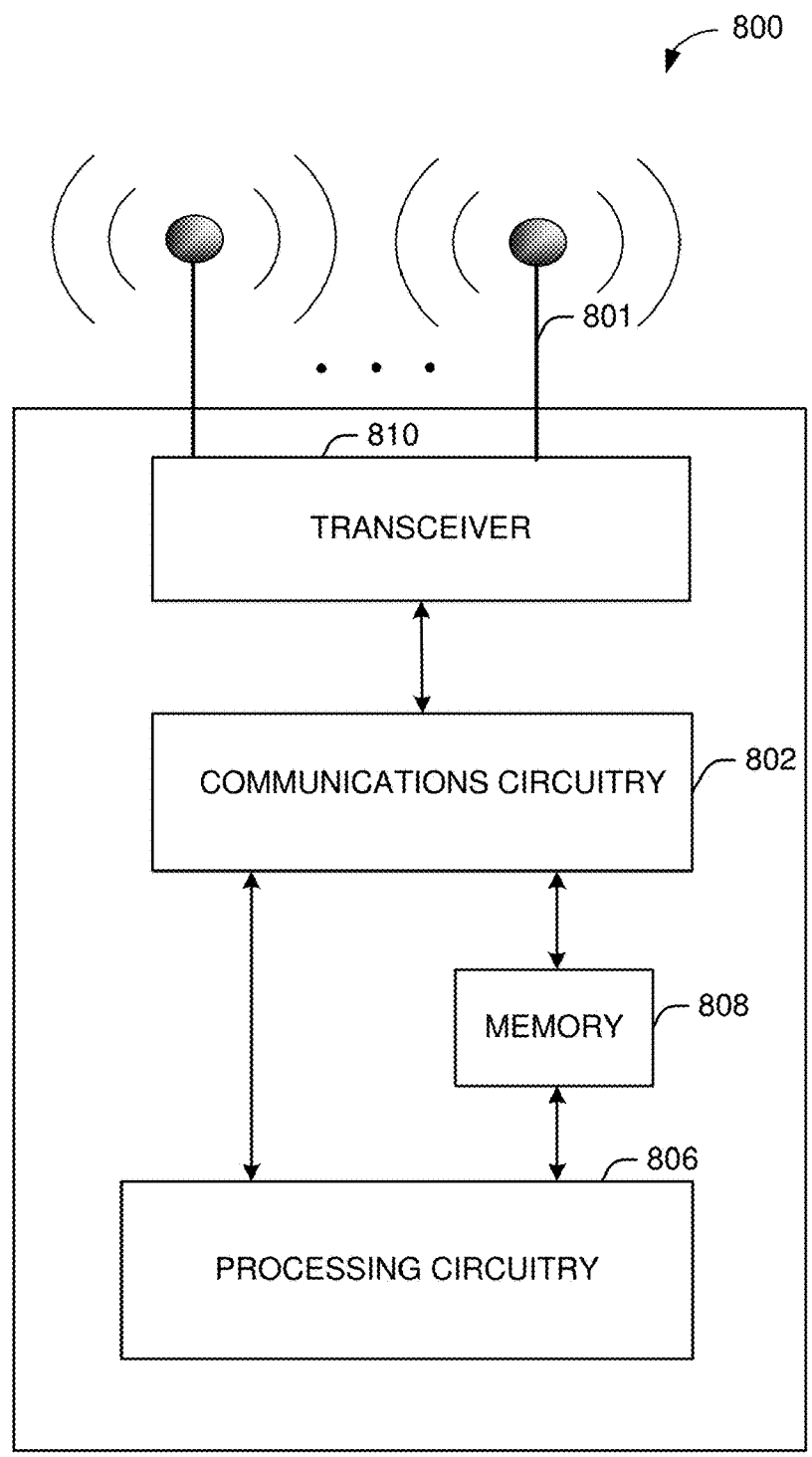
FIG. 8 depicts a functional diagram of an example communication station that may be suitable for use as a user device, in accordance with one or more example embodiments of the present disclosure.
Figure 9:
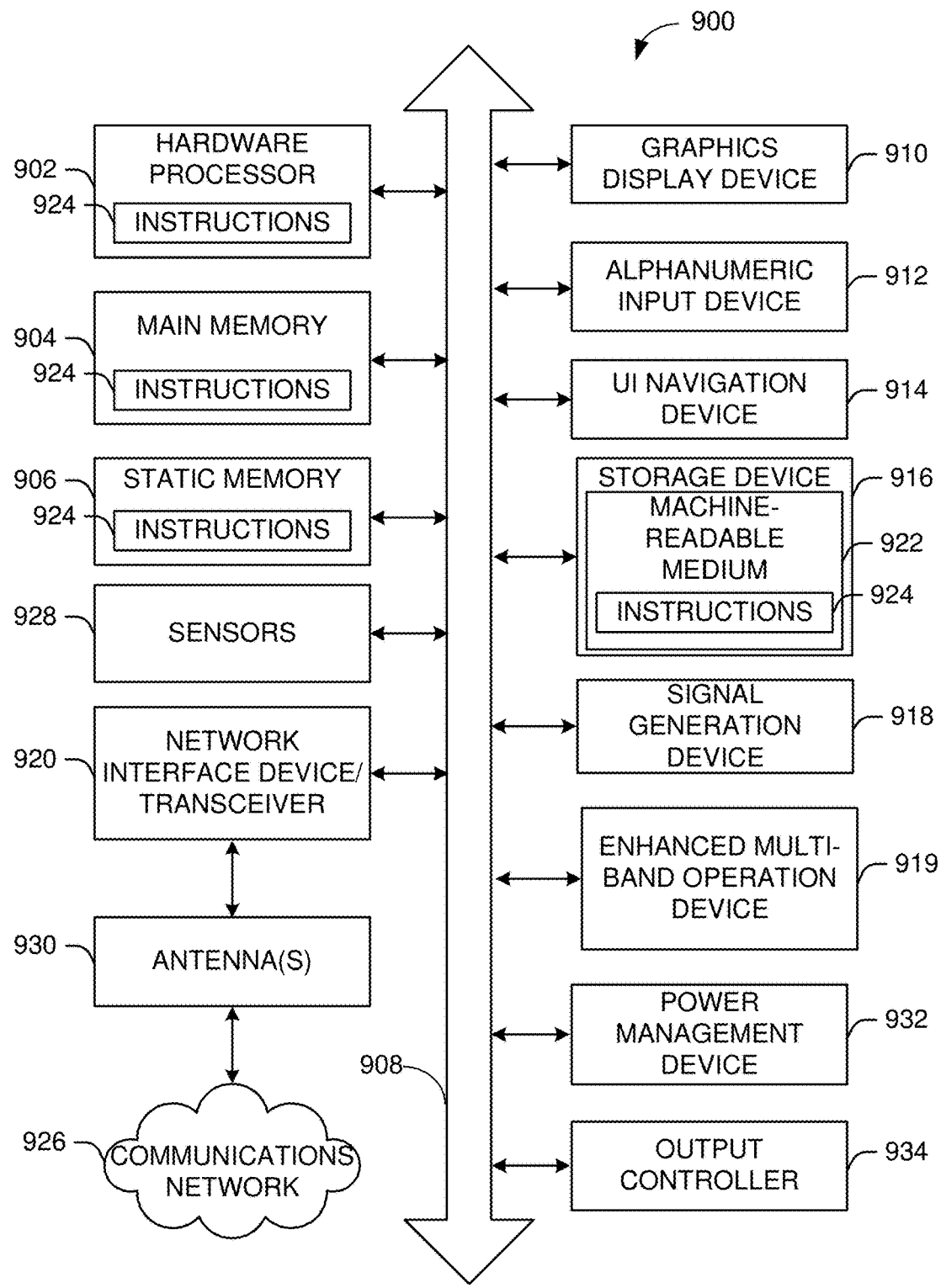
FIG. 9 depicts a block diagram of an example machine upon which any of one or more techniques (e.g., methods) may be performed, in accordance with one or more example embodiments of the present disclosure.

In some embodiments, the user devices 120 can include one or more computer systems similar to that of the functional diagram of FIG. 8 and/or the example machine/system of FIG. 9.

One or more illustrative user device(s) 120 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 may be STAs. The one or more illustrative user device(s) 120 may operate as a personal basic service set (PBSS) control point/access point (PCP/AP). The user device(s) 120 (e.g., 122, 124, 126, or 128) may include any suitable processor-driven device including, but not limited to, a mobile device or a non-mobile, e.g., a static, device. For example, user device(s) 120 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a Blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 may also include mesh stations in, for example, a mesh network, in accordance with one or more IEEE 802.11 standards and/or 3GPP standards.

Any of the user devices 120 (e.g., 122, 124, 126, or 128) may be configured to communicate with each other and any other component of the wireless network 100 directly and/or via one or more communications networks 130, wirelessly or wired. Any of the communications networks 130 may include, but not be limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user devices 120 (e.g., 122, 124, 126, or 128) may include one or more communications antennas. Communications antennas may be any suitable type of antenna corresponding to the communications protocols used by the user device(s) 120. Some non-limiting examples of suitable communications antennas include Wi-Fi antennas, IEEE 802.11 family of standards compatible antennas, directional antennas, non-directional antennas, dipole antennas, folded dipole antennas, patch antennas, MIMO antennas, or the like. The communications antenna may be communicatively coupled to a radio component to transmit and/or receive signals, such as communications signals, to and/or from the user devices 120 (e.g., 122, 124, 126, or 128).

Any of the user devices 120 (e.g., 122, 124, 126, or 128) may include any suitable radio and/or transceiver for transmitting and/or receiving radio frequency (RF) signals in the bandwidth and/or channels corresponding to the communications protocols utilized by any of the user device(s) 120 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi Direct protocols, as standardized by the Institute of Electrical and Electronics Engineers (IEEE) 802.11 standards and/or Wi-Fi Alliance standards." In certain example embodiments, the radio component, in cooperation with the communications antennas, may be configured to communicate via 2.4 GHz channels (e.g., 802.11b, 802.11g, 802.11n), 5 GHz channels (e.g., 802.11n, 802.11ac), or 60 GHz channels (e.g., 802.11ad, 802.11ay). In some embodiments, non-Wi-Fi protocols may be used for communications between devices, such as Bluetooth, dedicated short-range communication (DSRC), ultra-high frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and a digital baseband.

In one or more embodiments, the user devices 120 (e.g., 122, 124, 126, or 128) may exchange one or more frames 140. The frames 140 may be NAN frames used for multi-band communications. For example, the frames 140 may include discovery beacons, NAN management frames, SDFs, NAFs, and other frames used in NAN communications. The frames 140 may indicate multi-band capabilities of NAN devices, including band identifiers, channel numbers, device addresses, and other information. The frames 140 may be used to discover other devices, request and discover services offered by devices, establish NDLs, and exchange data over NDLs, for example.

FIG. 2A depicts an illustrative NAN synchronization structure 200.

Referring to FIG. 2A, the synchronization structure 200 may include a user device 201, a first DW 202, one or more slots (e.g., slot 204, slot 206, slot 208), and a second DW 210. The first DW 202 may be associated with a time unit 212 representing the length of time for the first DW 202 for the user device 201. The slot 204 may be associated with a time unit 214 representing the length of time for the slot 204 and one or more additional slots (e.g., slot 206, slot 208) during a DW interval 216. The DW interval 216 may represent the time between the first DW 202 and the second DW 210. The user device 201 may be a NAN device and may discover other NAN devices (e.g., the user devices 120 of FIG. 1) during the first DW 202, then NAN devices may establish a NDP and agree on specific NDL slots (e.g., slot 204, slot 206, slot 208) to facilitate data communication.

Figure 2B:
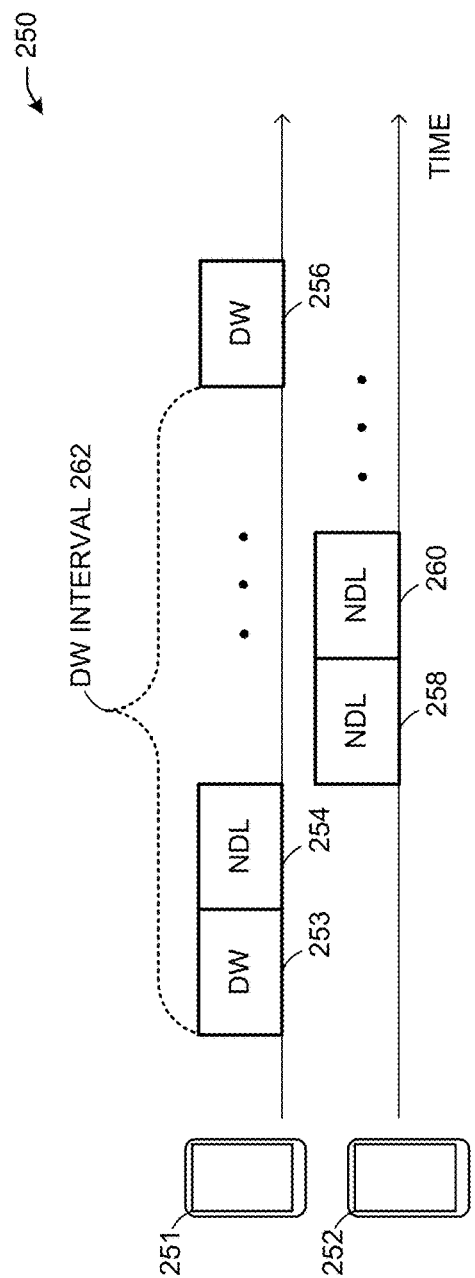
FIG. 2B depicts an illustrative NAN data link (NDL) establishment between NAN devices using the NAN synchronization structure of FIG. 2A.

FIG. 2B depicts an illustrative NDL establishment 250 between NAN devices using the NAN synchronization structure 200 of FIG. 2A.

Referring to FIG. 2B, the NDL establishment 250 may include a first user device 251 and a second user device 252, which may be NAN devices. The first user device 251 may use a first DW 253 to discover other NAN devices such as the second user device 252. The first user device 251 may transmit using a NDL 254, and the second user device 252 may transmit using a NDL 258 and a NDL 260. The first user device 251 and the second user device 252 may use the NAN synchronization structure 200 of FIG. 2A to communicate data until a next DW 256. The NDLs may be agreed upon by the first user device 251 and the second user device 252 for transmissions during a DW interval 262, which may represent the time interval between the DW 253 and the DW 256.

An established NDL (e.g., NDL 254) may be used for multiple services between the first user device 251 and the second user device 252. Different service may have different requirements like security and device addresses. As a result, the NDPs may be built specifically for a particular respective service. An NDP may have an address referred to as the NDI. The first user device 251 and the second user device 252 may use an address for discovery before setting up respective NDPs may be a NMI.

Figure 3:
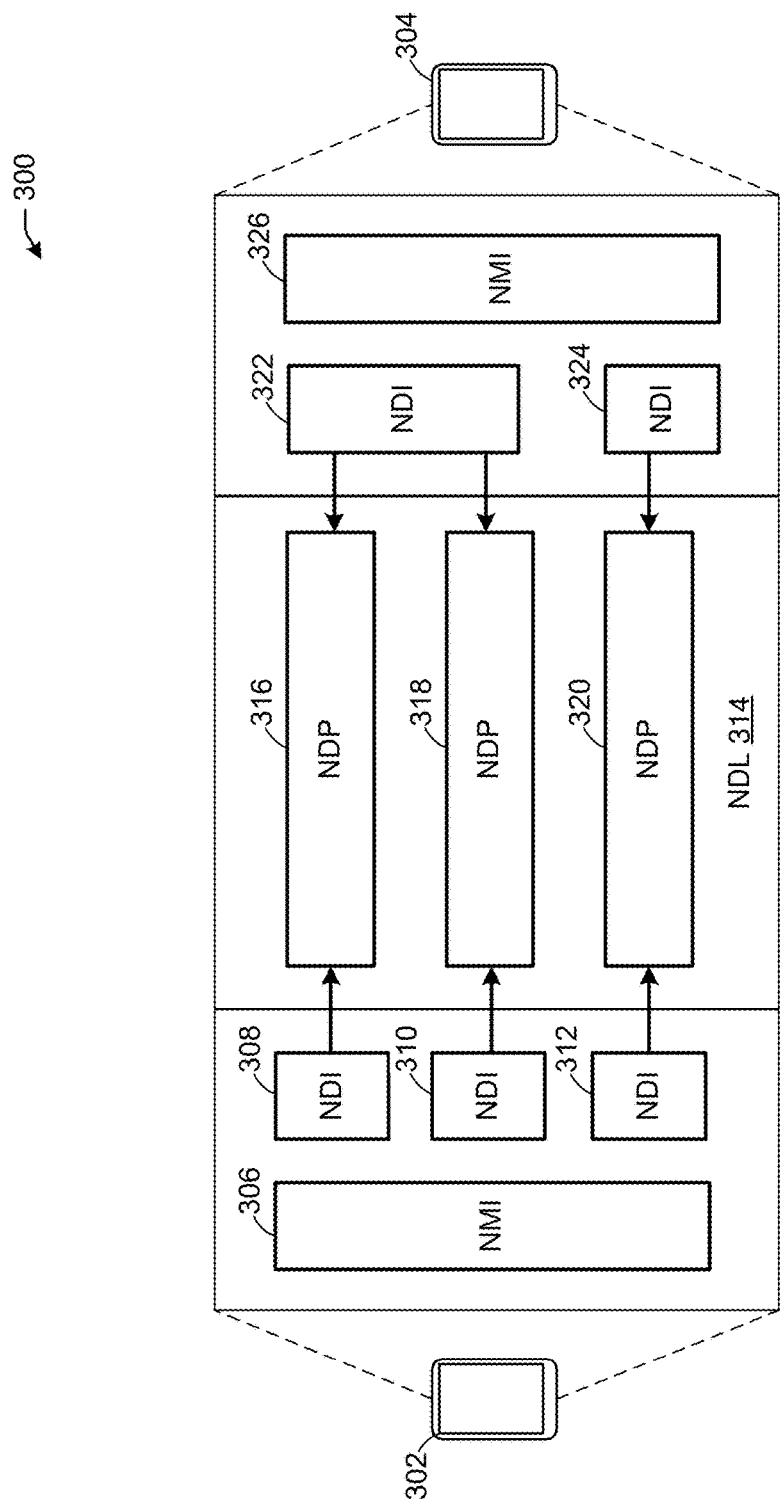
FIG. 3 depicts an illustrative schematic diagram of data path structure for multi-band operation.

FIG. 3 depicts an illustrative schematic diagram 300 of data path structure for multi-band operation.

Referring to FIG. 3, a user device 302 and a user device 304 may have NAN capabilities. The user device 302 may have a NMI 306 associated with an address, and the NMI 306 may facilitate operations of multiple NDIs, such as NDI 308, NDI 310, and NDI 312. The NMI 306 may use an address to establish the NDL 314, which may include multiple NDPs, such as NDP 316, NDP 318, and NDP 320. The NDI 308 may serve as the address for the NDP 316. The NDI 310 may serve as the address for the NDP 318. The NDI 312 may serve as the address for the NDP 320. The NDP 316 and the NDP 318 may use NDI 322 of the user device 304 (or the NDI 322 may be multiple NDIs), and the NDP 320 may use NDI 324 of the user device 304 (or may share a NDI of the user device 304 with any other NDP). The NDI 322 may serve as an address of the user device 304 for the NDP 316 and the NDP 318. The NDI 324 may serve as an address of the user device 304 for the NDP 320. A NMI 326 of the user device 304 may serve as an address for the NDI 322 and the NDI 324.

Figure 4:
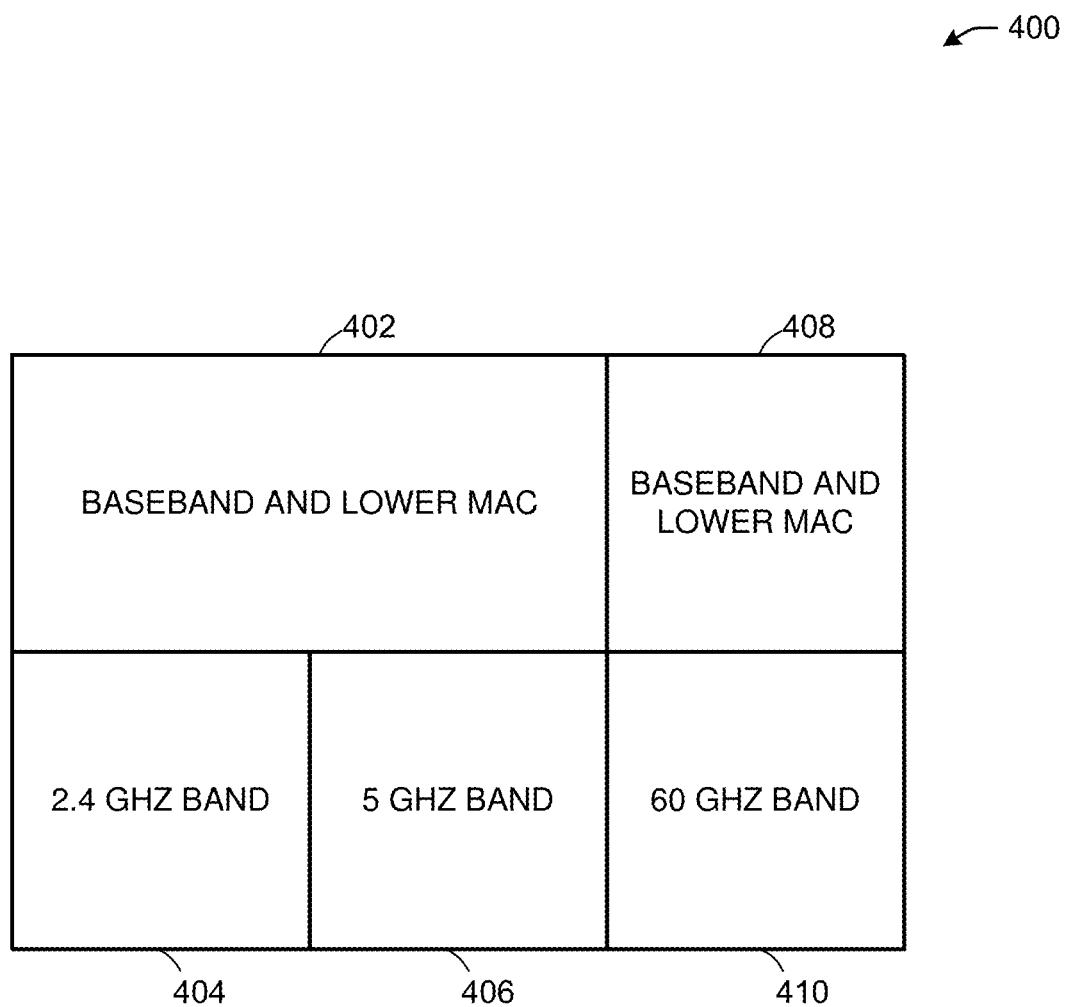
FIG. 4 depicts an illustrative schematic diagram of medium access control processing cores for multi-band operations.

FIG. 4 depicts an illustrative schematic diagram 400 of MAC processing cores for multi-band operations.

An example of two different MAC processing cores used for 2.4 GHz/5 GHz and 60 GHz bands is shown in FIG. 4. A baseband and lower-level MAC processing core 402 (e.g., a single chip) may facilitate communications on a 2.4 GHz band 404 and a 5 GHz band 406. A baseband and lower-level MAC processing core 408 (e.g., a single chip) may facilitate communications for a 60 GHz band 410 or other higher-frequency band. The baseband and lower-level MAC processing core 402 and the baseband and lower-level MAC processing core 408 may be separate chips used in NAN devices (e.g., the user devices 120 of FIG. 1). Baseband and lower-level MAC processing core 402 may support communications defined by the IEEE 802.11 b/a/g/n/ac communication standards. The baseband and lower-level MAC processing core 408 may support communications defined by the IEEE 802.11ad communication standard.

Referring to FIGS. 3 and 4, a NAN data interface may be used in operations in multiple bands when those bands are the 2.4 GHz band and the 5 GHz band because, as shown in FIG. 4, a single processing core may support the NAN interface in either band. However, as Wi-Fi devices move to multi-band capability, specifically with the addition of 60 GHz band for Wi-Fi capabilities, Wi-Fi devices may need the baseband and lower-level MAC processing core 408. To accommodate the use of multiple processing cores supporting different baseband and MAC operations, the NDI and data structure may be modified. For example, Wi-Fi devices may need to coordinate the functions of each processing core.

Because the baseband and lower-level MAC processing core 408 may support a higher bandwidth than the baseband and lower-level MAC processing core 402, the data procedures supported by the two processing cores may be different. For example, at different frequencies, the modulation schemes may be different. In addition, the baseband and lower-level MAC processing core 402 may facilitate omni-directional communications, whereas the 60 GHz band 410 may use a higher frequency and may need more directional antennas which are beamforming trained. The baseband and lower-level MAC processing core 408 may use different MAC operations. For example, if a NAN device with the two processing cores were using the 2.4 GHz band 404 or the 5 GHz band 406, and moved to a location proximal enough to a connected peer NAN device to use the 60 GHz band 410, the NAN devices may switch to the baseband and lower-level MAC processing core 408 with coordination. However, simply adding the two different processing cores to a device may not result in coordinated NAN communications with multi-band capabilities without some modifications and enhancements.

Figure 5A:
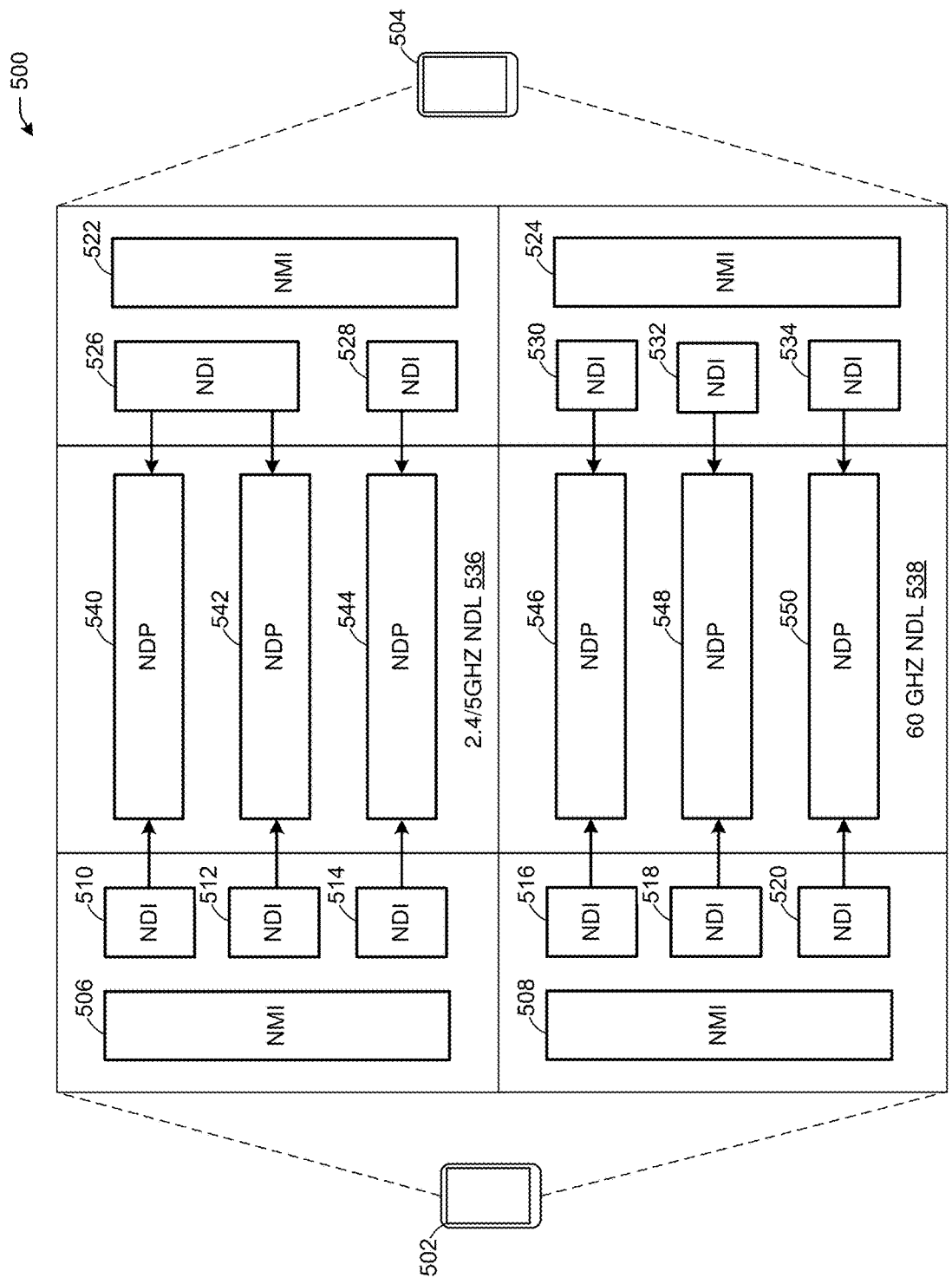
FIG. 5A depicts an illustrative schematic diagram of a data path structure for a multi-band operation system, in accordance with one or more example embodiments of the present disclosure.

FIG. 5A depicts an illustrative schematic diagram of a data path structure 500 for a multi-band operation system, in accordance with one or more example embodiments of the present disclosure.

Referring to FIG. 5A, a user device 502 and a user device 504 may be peer NAN devices. The user device 502 may use NMI 506 and NMI 508. The NMI 506 may support multiple NDIs, such as NDI 510, NDI 512, and NDI 514. The NMI 508 may support multiple NDIs, such as NDI 516, 518, and NDI 520. The user device 504 may use NMI 522 and NMI 524. The NMI 522 may support NDI 526 and NDI 528. The NMI 524 may support NDI 528. The NMI 524 may support NDI 530, NDI 532, and NDI 534. The user device 502 and the user device 504 may use NDL 536 for 2.4/5 GHz operations, and may use NDL 538 for 60 GHz operations. The NDI 526 and the NDI 510 may serve as respective addresses for NDP 540 between the NDI 526 and the NDI 510 using the NDL 536. The NDI 526 and the NDI 512 may serve as respective addresses for NDP 542 between the NDI 512 and the NDI 526 using the NDL 536. The NDI 528 and the NDI 514 may serve as respective addresses for NDP 544 between the NDI 514 and the NDI 528 using the NDL 536. The NDPs using the NDL 536 may be used for respective NAN services on the 2.4 GHz band or the 5 GHz band.

Still referring to FIG. 5A, the NDI 516 and the NDI 530 may serve as respective addresses for NDP 546 between the NDI 516 and the NDI 530 using the NDL 538. The NDI 518 and the NDI 532 may serve as respective addresses for NDP 548 between the NDI 518 and the NDI 532 using the NDL 538. The NDI 520 and the NDI 534 may serve as respective addresses for NDP 550 between the NDI 520 and the NDI 534 using the NDL 538. The NDPs of the NDL 538 may support the same or different services as the NDPs of the NDL 536. For example, the NDP 540 and the NDP 546 may support the same service, but the NDP 540 may not support the same security requirements as the NDP 546 on a 60 GHz band, so the NDP 546 may use the NDI 516 as an address for the user device 502 and the NDI 530 as an address for the user device 504 while the NDP 540 may use the NDI 510 as an address for the user device 502 and the NDI 526 as an address for the user device 504.

In one or more embodiments, the data path structure 500 may refer to option (1) for accommodating a multi-band operation including a 60 GHz band operation. In option (1), the NDL 538 may be built for the 60 GHz band and may be separate from the NDL 536 for the 2.4 GHz and 5 GHz bands. The user device 502 may use the NMI 508 to establish the NDL 538 in the 60 GHz band. The user device 502 may use the 2.4/5 GHz band to communicate the NMI 508 (e.g., using the one or more frames 140 of FIG. 1). A NDL may be established for any NMI and may be determined by the NMIs used by the devices to establish the NDL.

In one or more embodiments, the NMI 508 may be indicated to the user device 504 by including a multi-band element in a frame, as defined by an IEEE 802.11 specification, for example. The NMI 508 may be communicated to the user device 504 by defining a multi-band attribute as explained further herein. NDPs may be established to use the NDL 536, the NDL 538, or both the NDL 536 and the NDL 538. A same NDI may be used for the NDL 536 and the NDL 538 or 60 GHz. For example, the NDI 510 may be the same as the NDI 516, the NDI 518, and/or the NDI 520. An NDP may be transferred between the NDL 536 and the NDL 538. For example, if the NDI 510 is the same as the NDI 516, the NDP 540 may be transferred to the NDP 546, and vice versa. A NDP transfer may be useful in situations when use of a NAN service may be improved by using a different band. For example, a NAN voice service may be more stable in the 2.4/5 GHz band than the 60 GHz band, and NAN services which may use directional antennas may be better suited for the 60 GHz band. The distance between the user device 502 and the user device 504 may be considered by either device in determining whether to switch between bands. For example, 60 GHz operations may be more appropriate for shorter distances between the devices. Therefore, which processing core (e.g., chip) is used by a device may depend on the distance between peer devices.

In one or more embodiments, the NMI 506 may be the same as the NMI 508, or the NMIs for the user device 502 may be different. If the user device 502 uses the same NMI for the NMI 506 and the NMI 508, the user device 504 does not have to use the same NMI for the NMI 522 and the NMI 524. When using different NDLs, the NMIs used for the respective NDLs may use different MAC addresses. For example, in the NDL 536, the NMI 506 may use a MAC address (or some other address) for the 2.4/5 GHz bands, while the NMI 508 may use another MAC address for the NDL 538 in a higher frequency band. The NMI 506 and the NMI 508 may be the same NMI for the 2.4/5 GHz and 60 GHz bands, but the NMI 522 and the NMI 524 may be different for the user device 504, and may have different MAC addresses to allow for associating the MAC addresses with a respective NDL/frequency band.

Figure 5B:
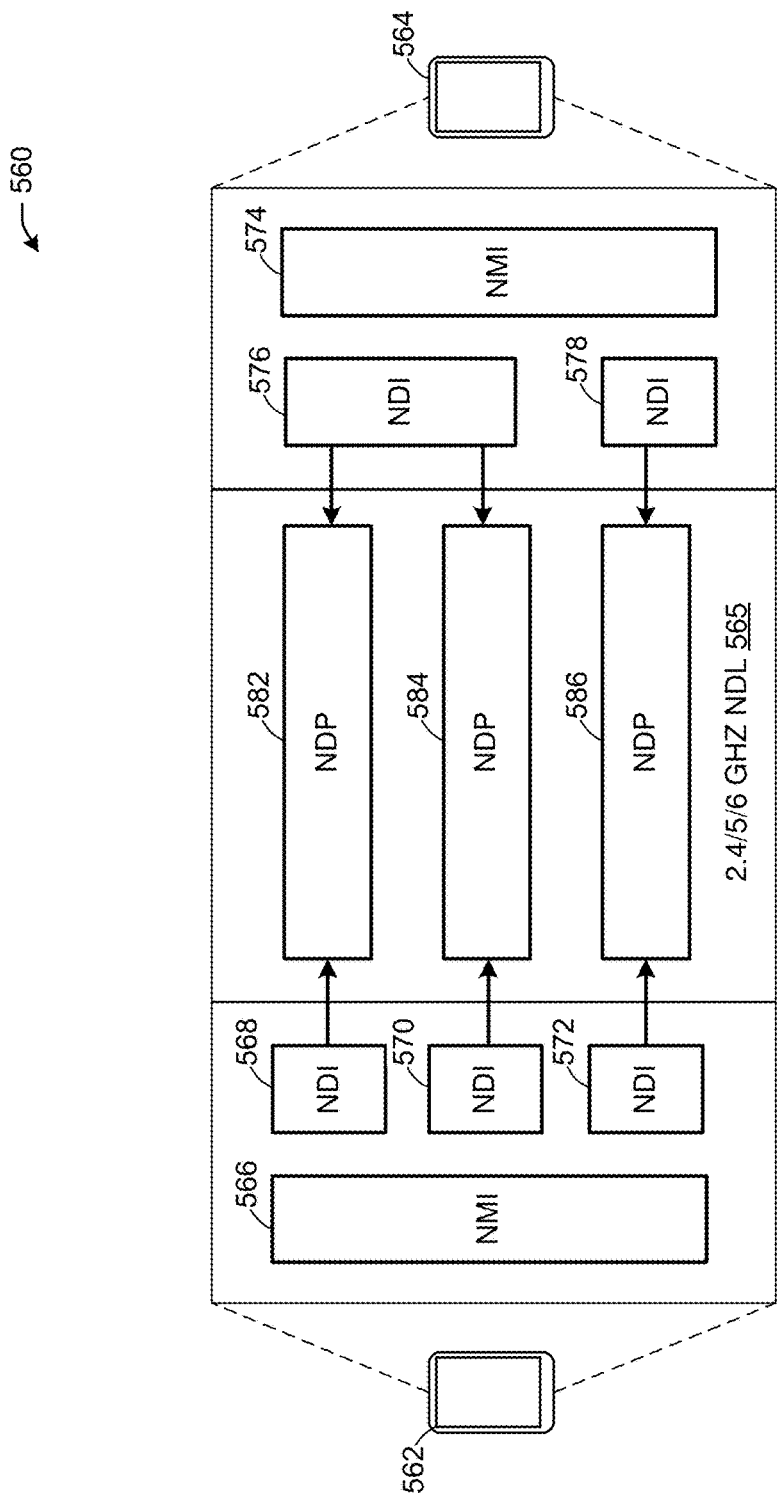
FIG. 5B depicts an illustrative schematic diagram of a data path structure for a multi-band operation system, in accordance with one or more example embodiments of the present disclosure.

FIG. 5B depicts an illustrative schematic diagram of a data path structure 560 for a multi-band operation system, in accordance with one or more example embodiments of the present disclosure.

Referring to FIG. 5B, a user device 562 and a user device 564 may have NAN capabilities, and may share a NDL 565 for both the 2.4/5 GHz bands and the 60 GHz band. The user device 562 may use NMI 566 to support NDI 568, NDI 570, and NDI 572. The user device 564 may use NMI 574 to support NDI 576 and NDI 578. The NDI 576 may serve as the address for the user device 564 for NDP 582 and NDP 584 (e.g., an NDI may support multiple NDPs). The NDI 578 may serve as the address for the user device 564 for NDP 586. The NDP 582 may be between the NDI 568 and the NDI 576. The NDP 584 may be between the NDI 570 and the NDI 576. The NDP 586 may be between the NDI 572 and the NDI 578.

The data path structure 560 may represent option (2) for accommodating a multi-band operation including a 60 GHz band operation. The NDL 565 may be built for the 2.4/5 GHz band operations and the 60 GHz band operations by leveraging the NAN data structure for the 2.4/5 GHz bands. A single NMI for each device may be used to establish the NDL 565. The NDPs may indicate requirements of transmitting data in a respective frequency band.

In one or more embodiments, the user device 562 and the user device 564 may unify the multi-band operations supported by multiple MAC processing cores (e.g., a 2.4/5 GHz processing core and a 60 GHz processing core). Because of the unification, the NDL 565 may support NDPs for operations in different bands.

In one or more embodiments, option (2) may be useful when a data link in one frequency band becomes unstable (e.g., a 60 GHz operation becomes unstable due to line of sight and beamforming training requirements), a NAN service requiring a more stable operation may be transferred to another band. The user device 562 or the user device 564 may request the transfer by indicating the frequency band.

Figure 6:
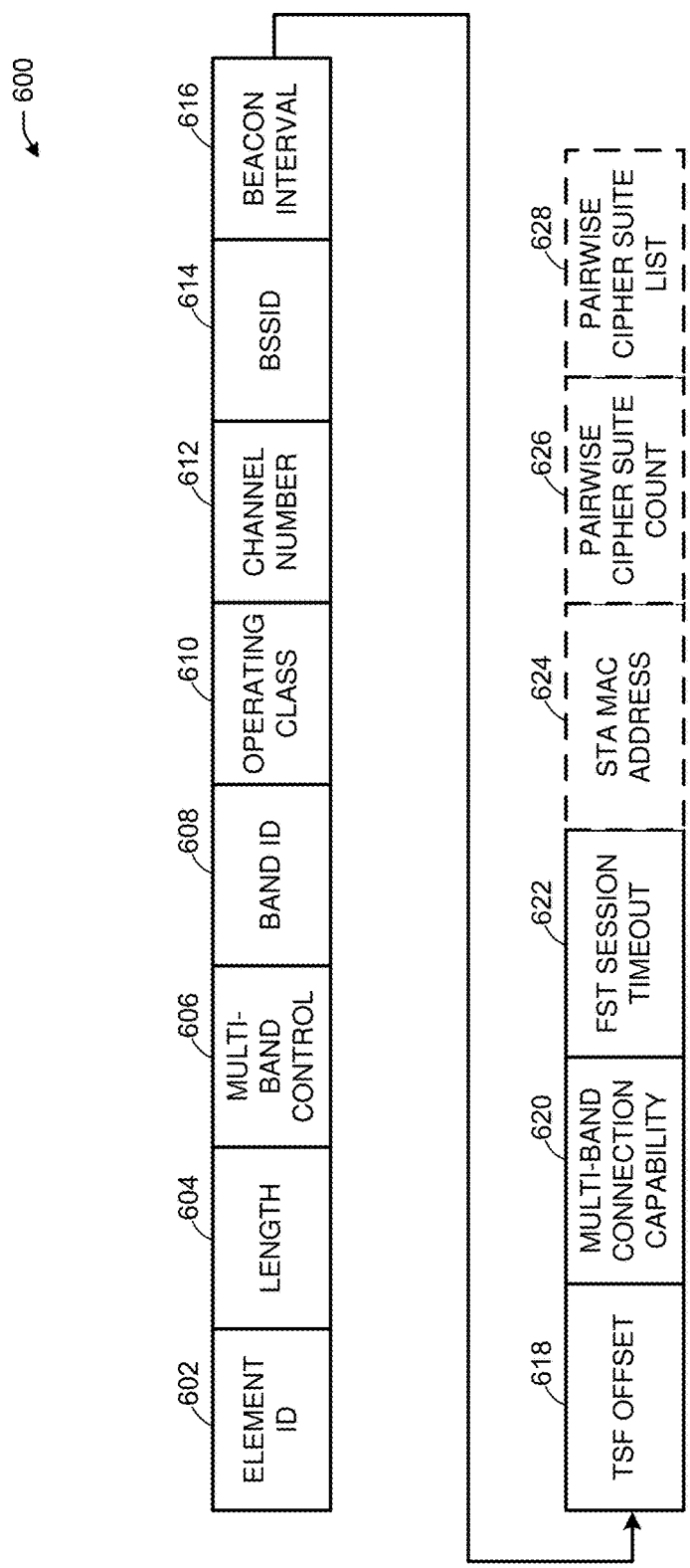
FIG. 6 depicts a portion of a multi-band frame element, in accordance with one or more example embodiments of the present disclosure.

FIG. 6 depicts a portion 600 of a multi-band frame element, in accordance with one or more example embodiments of the present disclosure.

Referring to FIG. 6, the portion 600 may include an element ID field 602 (e.g., with 1 octet), a length field 604 (e.g., with 1 octet), a multi-band control field 606 (e.g., with 1 octet), a band ID field 608 (e.g., with 1 octet), an operating class field 610 (e.g., with 1 octet), a channel number field 612 (e.g., with 1 octet), a BSSID field 614 (e.g., with 6 octets), a beacon interval field 616 (e.g., with 2 octets), a TSF offset field 618 (e.g., with 8 octets), a multi-band connection capability field 620 (e.g., with 1 octet), a fast session transfer (FST) session timeout field 622 (e.g., with 1 octet), a STA MAC address field 624 (with 0-6 octets), a pairwise cipher suite count field 626 (e.g., with 0-2 octets), and a pairwise cipher suite list field 628 (e.g., with a variable number of octets).

The portion 600 of multi-band information may be carried in a multi-band element of a NAN frame (e.g., the one or more frames 140 of FIG. 1), such as a NAN frame defined in an IEEE 802.11 specification. The STA MAC address field 624 may indicate the NMI used in a band indicated (e.g., by the band ID field 608) by the multi-band element. The BSSID field 614 may be set to the NAN cluster ID so that NAN devices in the NAN cluster may identify the frame carrying the portion 600. If a discovery beacon is transmitted in the indicated band, the beacon interval field 616 may be set to the discovery beacon interval (e.g., the DW interval 216 of FIG. 2A) in the indicated band, and the TSF offset field 618 may be set to indicate the TSF offset of the discovery beacon in the indicated band to the discovery beacon in the current band. If there is no discovery beacon transmitted in the indicated band, the beacon interval field 616 and the TSF offset field 618 may be reserved. The multi-band element may be included in an element container attribute of a NAN frame. The multi-band information of the portion 600 may be carried in a new multi-band attribute. An example of the fields of the portion 600 is shown below in Table 1.

NDL/NDP setup of 2.4 GHz/5 GHz band to indicate the NMI used in 60 GHz band and bootstrap the NDL/NDP setup in 60 GHz band.

In one or more embodiments, multi-band information may be included in a NAN SDF, NAN NAF, NAN synchronization beacon, NAN discovery beacon, and so on to bootstrap multi-band discovery.

In one or more embodiments, multi-band information may be included in the NDL/NDP setup to indicate the allowed band (e.g., using the band ID field 608) for a NDL setup (e.g., if a NDL is established between two devices with NMI 1 and NMI 2 on band 1). Two peer NAN devices may use NMI 1 and NMI 2 on band 2, so the NDL also may apply to band 2. A NDP may be associated with only one NDL. Packets of a NDP may be transmitted in the associated NDL. A NDP may be associated with more than one NDL. Packets of a NDP may be transmitted in the associated NDL(s) for link aggregation. The NMIs used by the setup of a NDP between two devices may determine the NDL associated with the NDP. A separate NDP setup may be required if a NDP intends to associate with multiple NDLs. A NAN device may terminate a NDP on an indicated NDL. The indicated NDL may be signaled by including a transmitter address (TA) and/or receiver address (RA), either of which may refer to the NMI of the NDL of a NAF, such as a data path termination NAF. Thus, to terminate a NDP, a NAF may indicate the associated NMI(s) for the NDP by including the TA and/or RA.

TABLE 1

Multi-band Attribute:

| Field Name | Size | Value | Description |
| --- | --- | --- | --- |
| Attribute ID | 1 | 0x00 | Identifies the type of NAN attribute. |
| Length | 2 | 11 | Length of the following field in the attribute. |
| Multi-Band Control | 1 | Variable | |
| Band ID | 1 | Variable | The Band ID field provides the identification of the frequency band related to the Operating Class and Channel Number fields. |
| Operating Class | 1 | Variable | Operating Class indicates the channel set for which the Multi-band attribute applies. |
| Channel Number | 1 | Variable | Operating Class and Channel Number together specify the channel frequency and spacing for which the Multi-band attribute applies. |
| FST Session Timeout | 1 | Variable | The FSTSessionTimeout field is used in the FST Setup Request frame to indicate the timeout value for FST session setup protocol. The FSTSessionTimeout field contains the duration, in TUs, after which the FST setup is terminated. |
| STA MAC Address | 6 | Variable | The STA MAC Address field contains the NMI MAC address that the transmitting STA uses while operating on the channel indicated in this attribute. |

The multi-band information of the portion 600 may include the NMI in the indicated band (e.g., as indicated by the STA MAC address field 624). The multi-band information may be included in an NDL/NDP setup (e.g., a NAN data path request/response frame) to "bootstrap" the NDL/NDP configuration in another band. For example, multi-band information of the portion 600 may be carried in a multi-band element within an element container attribute, or may be carried in a multi-band attribute included in the In one or more embodiments, a NAN device may be free to choose a NDI during NDP setup, (e.g., a same NDI may be used in different NDLs). If a NDP is associated with one NDL, a device may indicate a transfer of the NDP to another NDL when a transfer is desirable. A NAN device may include the multi-band information and indicate the corresponding NMIs on both devices to identify the destination NDL to which to transfer the NDP. A lower-layer MAC level (e.g., of processing circuitry) may use event to feed back the available band operation from a peer device to an upper layer MAC level. A "discovery result" event may be used to feed back multi-band information from a peer device to the upper layer.

In one or more embodiments, an upper layer MAC level may request a band requirement for NDP setup (e.g., a band restriction). A NDP may operate on any band or may be restricted to certain bands. A band requirement may indicate the bands to which a NDP may be limited. The NAN layer of processing circuitry may restrict transmission of NAN data for the NDP to certain bands based on the requirement. The NAN layer also may establish a NDL based on an indicated band requirement. For example, the NAN layer may establish NDLs using certain bands based on the indicated requirement. An upper layer of the processing circuitry may indicate the corresponding NMI of a peer device for set up, which may include the setup of a NDL on a specific band. The request signaling may be included in the data request event method.

In one or more embodiments, and option (2) may be a subcase of option (1) because option (2) may use the general design of option (1)2. In particular, if only one NMI is used on both peer devices for all bands, then only one NDL may be established. As a result, in option (2), the NAN specification may allow only one NMI to be used for a different band. Such a restriction may eliminate the need to include multi-band information in a NAN frame.

Figure 7A:
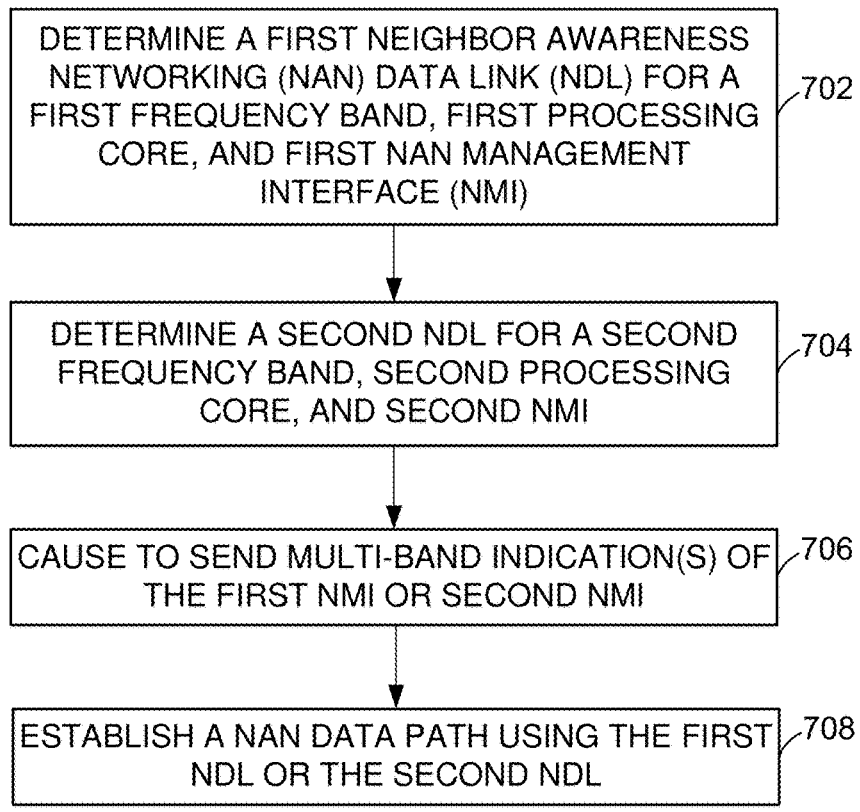
FIG. 7A depicts a flow diagram of illustrative process for a data path structure for multi-band operation system, in accordance with one or more embodiments of the disclosure.

FIG. 7A illustrates a flow diagram of illustrative process 700 for an illustrative data path structure for multi-band operation system, in accordance with one or more example embodiments of the present disclosure.

At block 702, processing circuitry of a device (e.g., the user device(s) 120 of FIG. 1) may determine a first NDL with a first frequency band, and a first processing core. The first frequency band may be a 2.4 GHz/5 GHz frequency band, a 60 GHz frequency band, or another frequency band. The first NDL may support one or more NMIs and one or more NDIs at a first NAN device, and may support one or more NMIs and one or more NDIs at a second NAN device. The first NDL may support multiple NDPs between respective NDIs at the NAN devices, and the respective NDPs may be established specifically for respective NAN services.

At block 704, the processing circuitry may determine a second NDL with a second frequency band, and a second processing core. The second frequency band may be different from the first frequency band. The second processing core may be the same processing core as the first processing core (e.g., as shown in FIG. 5B), or a different processing core than the first processing core (e.g., as shown in FIG. 5A). The second processing core may use a same NMI or different NMI at either NAN device connected by the second NDL. The NDPs used by the second processing core may be the same NDPs as the NDPs of the first NDL, but may support different security and other features for the same NAN services as any corresponding NDP of the first NDL, or may be different NDPs supporting different NAN services than the NDPs of the first NDL.

At block 706, the processing circuitry may cause the device to send one or more multi-band indications of at least one of the first NMI or the second NMI. The multi-band indications may be included in a multi-band element, which may communicate the NMI for any band (including NMIs for multiple bands). An STA MAC address field of the multi-band element may indicate the NMI used for a band indicated by the multi-band element (e.g., an NMI may be associated with the band indicated by a band identifier included in the multi-band element). A BSSID of the multi-band element may be set to indicate a NAN cluster identifier associated with a NAN cluster. If a discovery beacon is transmitted in a band indicated by the multi-band element, a beacon interval field of the multi-band element may be set to a discovery beacon interval (e.g., the time interval between the transmission of discovery beacons) in a band indicated by the multi-band element, and a TSF offset field of the multi-band element may be set to indicate a TSF offset of a discovery beacon in the indicated band to a discovery beacon in a current band. If a discovery beacon is not transmitted in a band indicated by the multi-band element, the beacon interval field and the TSF offset fields may be reserved. The multi-band information may include an NMI in the band indicated by the multi-band element. The multi-band information may include an operating class (e.g., indicating a channel set for which the multi-band attribute is applicable), a band identifier, and a channel number. Multi-band information may be included during the NDL/NDP setup (e.g., using a NAN data path request/response frame). For example, the multi-band information may be included in a multi-band element in an element container attribute of a frame, or in a multi-band attribute included in a NDL/NDP set up of the 2.4/5 GHz band to indicate the NMI used in the 60 GHz band. The multi-band information may be included in a NAN service discovery frame (SDF), NAN action frame (NAF), a NAN synchronization beacon, a NAN discovery beacon, or other NAN frames (e.g., as defined by the NAN technical standard). The multi-band information may be included in a NDL/NDP set up to indicate allowed bands for NDL set up. For example, if a NDL is established between two NAN devices using NMI 1 and NMI 2 on a first band, and if the NAN devices also use NMI1 and NMI 2 on a second band, then the NAN devices may apply the NDL to the second band.

At block 708, the device may establish a NDP with another NAN device using the first NDL or the second NDL. Establishing the NDP may include building a direct connection between the device and another NAN device, without an intermediate AP, to communicate data for NAN services and operations. The NDP may be established for the purpose of supporting a particular NAN service agreed upon by the device and the other NAN device.

Figure 7B:
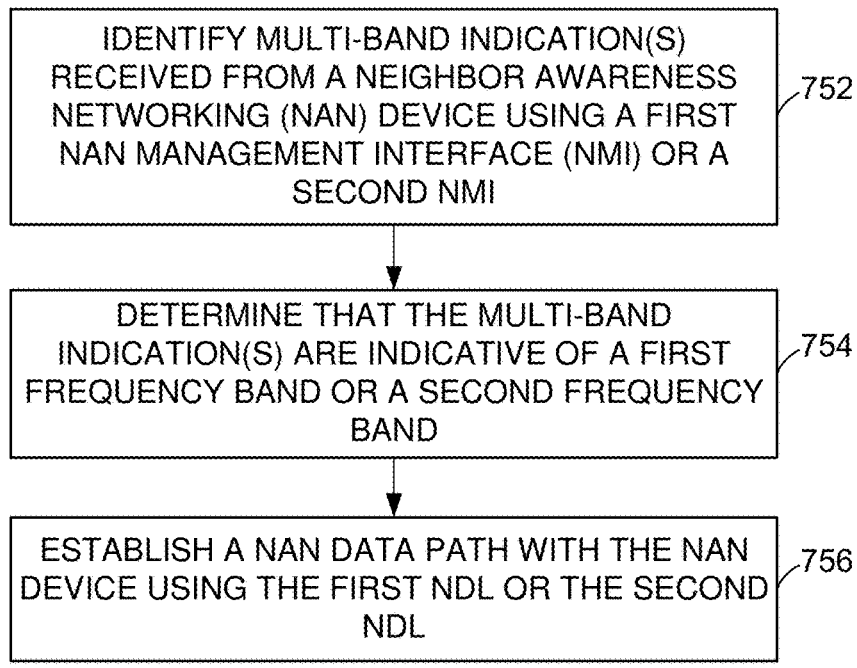
FIG. 7B depicts a flow diagram of illustrative process for a data path structure for multi-band operation system, in accordance with one or more embodiments of the disclosure.

FIG. 7B illustrates a flow diagram of illustrative process 750 for an illustrative data path structure for multi-band operation system, in accordance with one or more example embodiments of the present disclosure.

At block 752, a device (e.g., the user device(s) 120 of FIG. 1) may identify one or more multi-band indications received from a NAN device using at least one of a first NMI or a second NMI. A BSSID of the multi-band element may be set to indicate a NAN cluster identifier associated with a NAN cluster. If a discovery beacon is transmitted in a band indicated by the multi-band element, a beacon interval field of the multi-band element may be set to a discovery beacon interval (e.g., the time interval between the transmission of discovery beacons) in a band indicated by the multi-band element, and a TSF offset field of the multi-band element may be set to indicate a TSF offset of a discovery beacon in the indicated band to a discovery beacon in a current band. If a discovery beacon is not transmitted in a band indicated by the multi-band element, the beacon interval field and the TSF offset fields may be reserved. The multi-band information may include an NMI in the band indicated by the multi-band element. The multi-band information may include an operating class (e.g., indicating a channel set for which the multi-band attribute is applicable), a band identifier, and a channel number. Multi-band information may be included during the NDL/NDP setup (e.g., using a NAN data path request/response frame). For example, the multi-band information may be included in a multi-band element in an element container attribute of a frame, or in a multi-band attribute included in a NDL/NDP set up of the 2.4/5 GHz band to indicate the NMI used in the 60 GHz band. The multi-band information may be included in a NAN service discovery frame (SDF), NAN action frame (NAF), a NAN synchronization beacon, a NAN discovery beacon, or other NAN frames (e.g., as defined by the NAN technical standard). The multi-band information may be included in a NDL/NDP set up to indicate allowed bands for NDL set up. For example, if a NDL is established between two NAN devices using NMI 1 and NMI 2 on a first band, and if the NAN devices also use NMI1 and NMI 2 on a second band, then the NAN devices may apply the NDL to the second band.

At block 754, the device may determine that the one or more multi-band indications are indicative of a first frequency band or a second frequency band. The multi-band indications may be included in a multi-band element, which may communicate the NMI for any band (including NMIs for multiple bands). An STA MAC address field of the multi-band element may indicate the NMI used for a band indicated by the multi-band element (e.g., an NMI may be associated with the band indicated by a band identifier included in the multi-band element).

At block 756, the device may establish a NDP with the NAN device using the first NDL or the second NDL based on which frequency band was indicated by the multi-band indications. Establishing the NDP may include building a direct connection between the device and another NAN device, without an intermediate AP, to communicate data for NAN services and operations. The NDP may be established for the purpose of supporting a particular NAN service agreed upon by the device and the other NAN device.

It is understood that the above descriptions are for purposes of illustration and are not meant to be limiting.

FIG. 8 shows a functional diagram of an exemplary communication station 800 in accordance with some embodiments. In one embodiment, FIG. 8 illustrates a functional block diagram of a communication station that may be suitable for use as a user device 120 (FIG. 1) in accordance with some embodiments. The communication station 800 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 800 may include communications circuitry 802 and a transceiver 810 for transmitting and receiving signals to and from other communication stations using one or more antennas 801. The transceiver 810 may be a device comprising both a transmitter and a receiver that are combined and share common circuitry (e.g., communication circuitry 802). The communication circuitry 802 may include amplifiers, filters, mixers, analog to digital and/or digital to analog converters. The transceiver 810 may transmit and receive analog or digital signals. The transceiver 810 may allow reception of signals during transmission periods. This mode is known as full-duplex, and may require the transmitter and receiver to operate on different frequencies to minimize interference between the transmitted signal and the received signal. The transceiver 810 may operate in a half-duplex mode, where the transceiver 810 may transmit or receive signals in one direction at a time.

The communications circuitry 802 may include circuitry that can operate the physical layer (PHY) communications and/or medium access control (MAC) communications for controlling access to the wireless medium, and/or any other communications layers for transmitting and receiving signals. The communication station 800 may also include processing circuitry 806 and memory 808 arranged to perform the operations described herein. In some embodiments, the communications circuitry 802 and the processing circuitry 806 may be configured to perform operations detailed in FIGS. 1-9.

In accordance with some embodiments, the communications circuitry 802 may be arranged to contend for a wireless medium and configure frames or packets for communicating over the wireless medium. The communications circuitry 802 may be arranged to transmit and receive signals. The communications circuitry 802 may also include circuitry for modulation/demodulation, upconversion/downconversion, filtering, amplification, etc. In some embodiments, the processing circuitry 806 of the communication station 800 may include one or more processors. In other embodiments, two or more antennas 801 may be coupled to the communications circuitry 802 arranged for sending and receiving signals. The memory 808 may store information for configuring the processing circuitry 806 to perform operations for configuring and transmitting message frames and performing the various operations described herein. The memory 808 may include any type of memory, including non-transitory memory, for storing information in a form readable by a machine (e.g., a computer). For example, the memory 808 may include a computer-readable storage device, read-only memory (ROM), random-access memory (RAM), magnetic disk storage media, optical storage media, flash-memory devices and other storage devices and media.

In some embodiments, the communication station 800 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 800 may include one or more antennas 801. The antennas 801 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 800 may include one or more of a keyboard, a display, a non-volatile memory port, multiple antennas, a graphics processor, an application processor, speakers, and other mobile device elements. The display may be an LCD screen including a touch screen.

Although the communication station 800 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 800 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 800 may include one or more processors and may be configured with instructions stored on a computer-readable storage device memory.

FIG. 9 illustrates a block diagram of an example of a machine 900 or system upon which any one or more of the techniques (e.g., methodologies) discussed herein may be performed. In other embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environments. The machine 900 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module.

For example, under operation, the execution units may be configured by a first set of instructions to implement a first module at one point in time and reconfigured by a second set of instructions to implement a second module at a second point in time.

The machine (e.g., computer system) 900 may include a hardware processor 902 (e.g., a central processing unit (CPU), a graphics processing unit (GPU), a hardware processor core, or any combination thereof), a main memory 904 and a static memory 906, some or all of which may communicate with each other via an interlink (e.g., bus) 908. The machine 900 may further include a power management device 932, a graphics display device 910, an alphanumeric input device 912 (e.g., a keyboard), and a user interface (UI) navigation device 914 (e.g., a mouse). In an example, the graphics display device 910, alphanumeric input device 912, and UI navigation device 914 may be a touch screen display. The machine 900 may additionally include a storage device (i.e., drive unit) 916, a signal generation device 918 (e.g., a speaker), a data path structure for an enhanced multi-band operation device 919, a network interface device/transceiver 920 coupled to antenna(s) 930, and one or more sensors 928, such as a global positioning system (GPS) sensor, a compass, an accelerometer, or other sensor. The machine 900 may include an output controller 934, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 916 may include a machine readable medium 922 on which is stored one or more sets of data structures or instructions 924 (e.g., software) embodying or utilized by any one or more of the techniques or functions described herein. The instructions 924 may also reside, completely or at least partially, within the main memory 904, within the static memory 906, or within the hardware processor 902 during execution thereof by the machine 900. In an example, one or any combination of the hardware processor 902, the main memory 904, the static memory 906, or the storage device 916 may constitute machine-readable media.

The data path structure for the enhanced multi-band operation device 919 may carry out or perform any of the operations and processes (e.g., process 700 of FIG. 7A, process 750 of FIG. 7B) described and shown above.

In one embodiment, in option (1): a separate NDL may be built for 60 GHz band. The enhanced multi-band operation device 919 of the NAN device may use a different NMI to set up the NDL in the 60 GHz band. A NAN device may indicate to another NAN device the NMI used by the same NAN device in different band. The NMI in a different band may be communicated to the other NAN device by using the multi-band element defined in the IEEE 802.11 specification, for example. The NMI in a different band may be indicated by defining new multi-band attribute. For example, NAN measurement frame sent during a discovery window and/or a NAN frame sent during an NDL negotiation may indicate the NMI. A NDP may be set up to use the NDL in a 2.4 GHz/5 GHz band, the 60 GHz band, or both bands (e.g., based on a distance between the NAN devices). The same NDI may be used for the NDL in the 2.4 GHz/5 GHz band or the 60 GHz band. A NDP may be transferred from the NDL in the 60 GHz band to the 2.4 GHz/5 GHz band, or vice versa (e.g., based on a distance between the NAN devices).

In one embodiment, in option (2): one NDL (e.g., pipe) may be built for the 2.4 GHz/5 GHz/60 GHz band (e.g., one NDL for both the 2.4 GHz/5 GHz band and the 60 GHz band). This may represent a direct extension of an existing data structure. Only one NMI may be used for the NDL setup. The enhanced multi-band operation device 919 may send an NDP to indicate a requirement of transmitting in certain bands. Option (2) may be a subcase of option (1) depending on the usage of NMI on different bands between two devices.

In one embodiment, the enhanced multi-band operation device 919 may use a schedule setup operation with a separate data link from the NDL setup. Of two NAN devices in communication, one NAN device may use the same NMI for different cores, while the other NAN device may use a different NMI for respective cores.

In one embodiment, a device may unify a NAN operation of two different MAC cores (e.g., a 2.4 GHz/5 GHz MAC core and a 60 GHz MAC core) into a single chip. The enhanced multi-band operation device 919 may be included in multiple cores—one for the 2.4 GHz/5 GHz band, and one or more additional cores for other bands—or may be support multiple bands from the same core. Because a data link in the 60 GHz band may be unstable due to beamforming training and line of sight requirements, a NAN service such as a voice service (e.g., a service requiring a stable operation) may be better in the 2.4 GHz/5 GHz band. Thus, a NAN device may request a transfer from the 60 GHz band to the 2.4 GHz/5 GHz band based on the type of service used by the NAN devices.

In one embodiment, using option (1), the enhanced multi-band operation device 919 may maintain the operation of multiple NMIs in different bands. For example, one NMI may be used for the 2.4/5 GHz band, and another NMI may be used for the 60 GHz or other higher frequency band. A NDL may be established for any NMI in any band. A NDL between two NAN devices may be determined by a pair of NMIs used by the two NAN devices for NDL setup. The NAN devices may send frames including a multi-band element, which may communicate the NMI for any band (including NMIs for multiple bands). An STA MAC address field of the multi-band element may indicate the NMI used for a band indicated by the multi-band element (e.g., an NMI may be associated with the band indicated by a band identifier included in the multi-band element). A basic service set identifier (BSSID) of the multi-band element may be set to indicate a NAN cluster identifier associated with a NAN cluster. If a discovery beacon is transmitted in a band indicated by the multi-band element, a beacon interval field of the multi-band element may be set to a discovery beacon interval (e.g., the time interval between the transmission of discovery beacons) in a band indicated by the multi-band element, and a TSF offset field of the multi-band element may be set to indicate a TSF offset of a discovery beacon in the indicated band to a discovery beacon in a current band. If a discovery beacon is not transmitted in a band indicated by the multi-band element, the beacon interval field and the TSF offset fields may be reserved. The multi-band element may be included in an element container attribute of a NAN frame.

In one embodiment, the enhanced multi-band operation device 919 may determine the multi-band information and include the multi-band information in a multi-band attribute, which may be added to an existing format of the multi-band element. The multi-band information may include an NMI in the band indicated by the multi-band element. The multi-band information may include an operating class (e.g., indicating a channel set for which the multi-band attribute is applicable), a band identifier, and a channel number. Multi-band information may be included during the NDL/NDP setup (e.g., using a NAN data path request/response frame). For example, the multi-band information may be included in a multi-band element in an element container attribute of a frame, or in a multi-band attribute included in a NDL/NDP set up of the 2.4/5 GHz band to indicate the NMI used in the 60 GHz band.

In one embodiment, the enhanced multi-band operation device 919 may include the multi-band information in a NAN service discovery frame (SDF), NAN action frame (NAF), a NAN synchronization beacon, a NAN discovery beacon, or other NAN frames (e.g., as defined by the NAN technical standard). The multi-band information may be included in a NDL/NDP set up to indicate allowed bands for NDL set up. For example, if a NDL is established between two NAN devices using NMI 1 and NMI 2 on a first band, and if the NAN devices also use NMI1 and NMI 2 on a second band, then the NAN devices may apply the NDL to the second band.

In one embodiment, the enhanced multi-band operation device 919 may terminate a NDP on an indicated NDL (e.g., a NDL indicated by a transmitter address or receiver address of a frame). The indicated NDL may refer to an NMI of the NDL. The NDL may be indicated using a NAF.

In one embodiment, the enhanced multi-band operation device 919 may select an NDI during a NDP setup. For example, the same NDI may be used with different NDLs. If an NDP is associated with only one NDL, a NAN device may indicate the transfer of an NDP to another NDL (e.g., a transfer from a NDL in one band to a NDL in another band). A NAN device may include the multi-band information and may indicate corresponding NMIs on both connected NAN devices to identify a destined NDL used to transfer the NDP.

In one embodiment, the enhanced multi-band operation device 919 may restrict the transmission of data of a NDP on certain bands based on requirements of a NDP. The NAN layer may set up a NDL based on an indicated NDP requirement. For example, the NAN layer may set up a NDL on certain bands allowed by the NDP requirement. The upper MAC layer may indicate a corresponding NMI of a peer NAN device for a setup which may include the setup of a NDL on a specific band. Request signaling may be included in a data request process.

In one embodiment, using option (2), if only one NMI is used at both NAN peer devices for all bands, then only NDL may need to be established by the enhanced multi-band operation device 919. As a result, one NMI may be used for different bands, eliminating a need to include multi-band information. The upper MAC layer may request a band requirement for a NDP setup. The NDP may operate in some or all bands.

It is understood that the above are only a subset of what the data path structure for the enhanced multi-band operation device 919 may be configured to perform and that other functions included throughout this disclosure may also be performed by the data path structure for the enhanced multi-band operation device 919.

While the machine-readable medium 922 is illustrated as a single medium, the term "machine-readable medium" may include a single medium or multiple media (e.g., a centralized or distributed database, and/or associated caches and servers) configured to store the one or more instructions 924.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 900 and that cause the machine 900 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 924 may further be transmitted or received over a communications network 926 using a transmission medium via the network interface device/transceiver 920 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 920 may include one or more physical jacks (e.g., Ethernet, coaxial, or phone jacks) or one or more antennas to connect to the communications network 926. In an example, the network interface device/transceiver 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 900 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising memory and processing circuitry configured to: establish an neighbor awareness networking data link (NDL) with a neighbor awareness networking (NAN) device; determine a multiband attribute comprising one or more fields; and cause to send a NAN frame comprising the multiband attribute to the NAN device.

Example 2 may include the device of example 1 and/or some other example herein, wherein the NDL it may be associated with a 60 GHz frequency band.

Example 3 may include the device of example 1 and/or some other example herein, wherein the multiband attribute comprises at least one of an operating class operating class, a band identification (ID), or a channel number.

Example 4 may include the device of example 1 and/or some other example herein, wherein the NAN frame may be a NAN data link (NDL) or a null data packet (NDP) frame.

Example 5 may include the device of example 1 and/or some other example herein, wherein the memory and the processing circuitry are further configured to determine a null data packet (NDP) frame may be associated with one NAN data link (NDL).

Example 6 may include the device of example 1 and/or some other example herein, wherein the memory and the processing circuitry are further configured to determine an indication to transfer the NDP two another NDL.

Example 7 may include the device of example 1 and/or some other example herein, further comprising a transceiver configured to transmit and receive wireless signals.

Example 8 may include the device of example 7 and/or some other example herein, further comprising an antenna coupled to the transceiver.

Example 9 may include a non-transitory computer-readable medium storing computer-executable instructions which when executed by one or more processors result in performing operations comprising: establishing an neighbor awareness networking data link (NDL) with a neighbor awareness networking (NAN) device; determining a multiband attribute comprising one or more fields; and causing to send a NAN frame comprising the multiband attribute to the NAN device.

Example 10 may include the non-transitory computer-readable medium of example 9 and/or some other example herein, wherein the NDL it may be associated with a 60 GHz frequency band.

Example 11 may include the non-transitory computer-readable medium of example 9 and/or some other example herein, wherein the multiband attribute comprises at least one of an operating class operating class, a band identification (ID), or a channel number.

Example 12 may include the non-transitory computer-readable medium of example 9 and/or some other example herein, wherein the NAN frame may be a NAN data link (NDL) or a null data packet (NDP) frame.

Example 13 may include the non-transitory computer-readable medium of example 9 and/or some other example herein, wherein the operations further comprise determining a null data packet (NDP) frame may be associated with one NAN data link (NDL).

Example 14 may include the non-transitory computer-readable medium of example 9 and/or some other example herein, wherein the operations further comprise determining an indication to transfer the NDP two another NDL.

Example 15 may include a method comprising: establishing, by one or more processors, an neighbor awareness networking data link (NDL) with a neighbor awareness networking (NAN) device; determining a multiband attribute comprising one or more fields; and causing to send a NAN frame comprising the multiband attribute to the NAN device.

Example 16 may include the method of example 15 and/or some other example herein, wherein the NDL it may be associated with a 60 GHz frequency band.

Example 17 may include the method of example 15 and/or some other example herein, wherein the multiband attribute comprises at least one of an operating class operating class, a band identification (ID), or a channel number.

Example 18 may include the method of example 15 and/or some other example herein, wherein the NAN frame may be a NAN data link (NDL) or a null data packet (NDP) frame.

Example 19 may include the method of example 15 and/or some other example herein, further comprising determining a null data packet (NDP) frame may be associated with one NAN data link (NDL).

Example 20 may include the method of example 15 and/or some other example herein, further comprising determining an indication to transfer the NDP two another NDL.

Example 21 may include an apparatus comprising means for: establishing an neighbor awareness networking data link (NDL) with a neighbor awareness networking (NAN)

device; determining a multiband attribute comprising one or more fields; and causing to send a NAN frame comprising the multiband attribute to the NAN device.

Example 22 may include the apparatus of example 21 and/or some other example herein, wherein the NDL it may be associated with a 60 GHz frequency band.

Example 23 may include the apparatus of example 21 and/or some other example herein, wherein the multiband attribute comprises at least one of an operating class operating class, a band identification (ID), or a channel number.

Example 24 may include the apparatus of example 21 and/or some other example herein, wherein the NAN frame may be a NAN data link (NDL) or a null data packet (NDP) frame.

Example 25 may include the apparatus of example 21 and/or some other example herein, further comprising determining a null data packet (NDP) frame may be associated with one NAN data link (NDL).

Example 26 may include the apparatus of example 21 and/or some other example herein, further comprising determining an indication to transfer the NDP two another NDL.

Example 27 may include one or more non-transitory computer-readable media comprising instructions to cause an electronic device, upon execution of the instructions by one or more processors of the electronic device, to perform one or more elements of a method described in or related to any of examples 1-26, or any other method or process described herein.

Example 28 may include an apparatus comprising logic, modules, and/or circuitry to perform one or more elements of a method described in or related to any of examples 1-26, or any other method or process described herein.

Example 29 may include a method, technique, or process as described in or related to any of examples 1-26, or portions or parts thereof.

Example 30 may include an apparatus comprising: one or more processors and one or more computer readable media comprising instructions that, when executed by the one or more processors, cause the one or more processors to perform the method, techniques, or process as described in or related to any of examples 1-26, or portions thereof.

Example 31 may include a method of communicating in a wireless network as shown and described herein.

Example 32 may include a system for providing wireless communication as shown and described herein.

Example 33 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A neighbor awareness networking (NAN) device comprising storage coupled to processing circuitry, the processing circuitry configured to:
    determine a first NAN data link (NDL) associated with a first frequency band, a first processing core of the NAN device, and a first NAN management interface (NMI);
    determine a second NDL associated with a second frequency band, a second processing core of the NAN device, and a second NMI, wherein the first frequency band is different than the second frequency band, and wherein the first processing core of the NAN device is different than the second processing core of the NAN device;
    generate a NAN frame comprising one or more multi-band indications of at least one of the first NMI or the second NMI, wherein the one or more multi-band indications are indicative of at least one of the first frequency band or the second frequency band;
    cause to send the NAN frame; and
    establish a NAN data path (NDP) with a second NAN device using at least one of the first NDL or the second NDL.

2. The NAN device of claim 1, wherein the first NMI is the same as the second NMI and is associated with the first processing core of the NAN device and the second processing core of the NAN device.

3. The NAN device of claim 1, wherein the first NMI is different from the second NMI.

4. The NAN device of claim 1, wherein a NAN data interface address is associated with the first NDL and the second NDL.

5. The NAN device of claim 1, wherein a first NAN data interface address is associated with the first NDL, wherein a second NAN data interface address is associated with the second NDL, and wherein the first NAN data interface address is different from the second NAN data interface address.

6. The NAN device of claim 1, wherein the NDP is a first NDP, wherein the first NDP uses a third NMI associated with the second NAN device, the processing circuitry further configured to establish a second NDP with the second NAN device using a fourth NMI associated with the second NAN device.

7. The NAN device of claim 1, wherein the NDP is a first NDP, wherein the first NDP uses the first NDL, the processing circuitry being further configured to transfer the first NDP to a second NDP with the second NAN device, wherein the second NDP uses the second NDL.

8. The NAN device of claim 1, wherein the first frequency band is 2.4 GHz or 5 GHz, and wherein the second frequency band is 60 GHz.

9. The NAN device of claim 1, wherein the one or more multi-band indications comprise a multi-band indication, wherein the multi-band indication indicates an address associated with the first NMI, the second NMI, the first frequency band, and the second frequency band.

10. The NAN device of claim 1, wherein the one or more multi-band indications comprise a first multi-band indication and a second multi-band indication, wherein the first multi-band indication indicates a first address associated with the first NMI and the first frequency band, wherein the second multi-band indication indicates a second address associated with the second NMI and the second frequency band, and wherein the first address is different from the second address.

11. The NAN device of claim 1, the processing circuitry being further configured to identify a multi-band indication received from the second NAN device, wherein the multi-band indication indicates at least one of the first frequency band or the second frequency band.

12. The NAN device of claim 1, wherein the NDP is a first NDP using the first NDL, wherein the first NDP is associated with a service, the processing circuitry being further configured to establish a second NDP using the second NDL, wherein the second NDP is associated with the service.

13. The NAN device of claim 1, wherein the NDP is a first NDP using the first NDL, wherein the first NDP is associated with a first service, the processing circuitry being further configured to establish a second NDP using the second NDL, wherein the second NDP is associated with a second service, wherein the first service is different from the second service.

14. A non-transitory computer-readable medium storing computer-executable instructions which when executed by one or more processors result in performing operations comprising:
    identifying, by a first neighbor awareness networking (NAN) device, a NAN frame received from a second NAN device, the NAN frame comprising one or more multi-band indications, wherein the one or more multi-band indications are received using at least one of a first NAN management interface (NMI) or a second NMI,
    determining that the one or more multi-band indications are indicative of at least one of a first frequency band or a second frequency band, wherein the first frequency band is different than the second frequency band, wherein a first NAN data link (NDL) associated with the first frequency band, a first processing core of the first NAN device, and the first NMI, wherein a second NDL is associated with the second frequency band, a second processing core of the first NAN device, and the second NMI, wherein the first processing core of the first NAN device is different than the second processing core of the first NAN device; and
    establishing a NAN data path (NDP) with the second NAN device using at least one of the first NDL or the second NDL.

15. The non-transitory computer-readable medium of claim 14, wherein the first NMI is the same as the second NMI and is associated with the first processing core of the first NAN device and the second processing core of the first NAN device.

16. The non-transitory computer-readable medium of claim 14, wherein the first NMI is different from the second NMI.

17. The non-transitory computer-readable medium of claim 14, wherein a NAN data interface address is associated with the first NDL and the second NDL.

18. The non-transitory computer-readable medium of claim 14, wherein a first NAN data interface address is associated with the first NDL, wherein a second NAN data interface address is associated with the second NDL, and wherein the first NAN data interface address is different from the second NAN data interface address.

19. The non-transitory computer-readable medium of claim 14, wherein the NDP is a first NDP, wherein the first NDP uses a third NMI associated with the second NAN device, the operations further comprising establishing a second NDP with the second NAN device using a fourth NMI associated with the second NAN device.

20. A method, comprising:
 determining, by processing circuitry of a first neighbor awareness networking (NAN) device, a first NAN data link (NDL) associated with a first frequency band, a first processing core of the first NAN device, and a first NAN management interface (NMI);
 determining, by the processing circuitry, a second NDL associated with a second frequency band, a second processing core of the first NAN device, and a second NMI, wherein the first frequency band is different than the second frequency band, and wherein the first processing core of the first NAN device is different than the second processing core of the first NAN device;
 generating, by the processing circuitry, a NAN frame comprising one or more multi-band indications of at least one of the first NMI or the second NMI, wherein the one or more multi-band indications are indicative of at least one of the first frequency band or the second frequency band;
 causing to send the NAN frame; and
 establishing, by the processing circuitry, a NAN data path (NDP) with a second NAN device using at least one of the first NDL or the second NDL.

* * * * *

UNITED STATES PATENT AND TRADEMARK OFFICE
CERTIFICATE OF CORRECTION

PATENT NO. : 10,798,707 B2
APPLICATION NO. : 16/230492
DATED : October 6, 2020
INVENTOR(S) : Huang et al.

Page 1 of 1

It is certified that error appears in the above-identified patent and that said Letters Patent is hereby corrected as shown below:

On the Title Page

Item (72), In "Inventors", in Column 1, Line 5, delete "Michal Glik" and insert --Michael Glik-- therefore.

Signed and Sealed this
Thirtieth Day of March, 2021

Drew Hirshfeld
*Performing the Functions and Duties of the
Under Secretary of Commerce for Intellectual Property and
Director of the United States Patent and Trademark Office*